United States Patent [19]

Lawson et al.

[11] 4,032,308

[45] June 28, 1977

[54] FILTERING A GAS STREAM

[75] Inventors: Robert Lawson, Middlesbrough; Reginald S. Young, Uxbridge, both of England

[73] Assignee: British Steel Corporation, London, England

[22] Filed: Oct. 28, 1975

[21] Appl. No.: 626,046

[30] Foreign Application Priority Data

Oct. 28, 1974 United Kingdom ............ 46431/74

[52] U.S. Cl. ..................................... 55/96; 55/283; 55/288; 55/302; 55/385 D; 73/421.5 A
[51] Int. Cl.² ......................................... B01D 46/04
[58] Field of Search ............ 55/96, 270, 272, 283, 55/288, 293, 301, 302, 291, 385 D; 73/421.5 A

[56] References Cited

UNITED STATES PATENTS

| 2,746,561 | 5/1956 | Beber et al. ........................ 55/272 |
| 3,178,868 | 4/1965 | Gibby ................................. 55/96 |
| 3,457,787 | 7/1969 | Maatsch et al. .................... 55/96 |
| 3,521,428 | 7/1970 | Dollinger et al. .................. 55/96 |
| 3,766,715 | 10/1975 | Archer ............................... 55/96 |
| 3,893,833 | 7/1975 | Ulvstad ............................. 55/293 |
| R24,954 | 3/1961 | Church .............................. 55/302 |

Primary Examiner—Frank W. Lutter
Assistant Examiner—David L. Lacey
Attorney, Agent, or Firm—Bacon & Thomas

[57] ABSTRACT

In order to clean collected dust particles periodically from a filter, for example in a sampling line (16) for removing waste gases from a steelmaking process for analysis, the filter (17) is first pressurised on both sides and the pressure is then suddenly released on the inlet side of the filter (V8) to shock the deposited particles free of the filter element. A continuous reverse flow through the filter of purging gas may follow to clear dust from the system.

6 Claims, 1 Drawing Figure

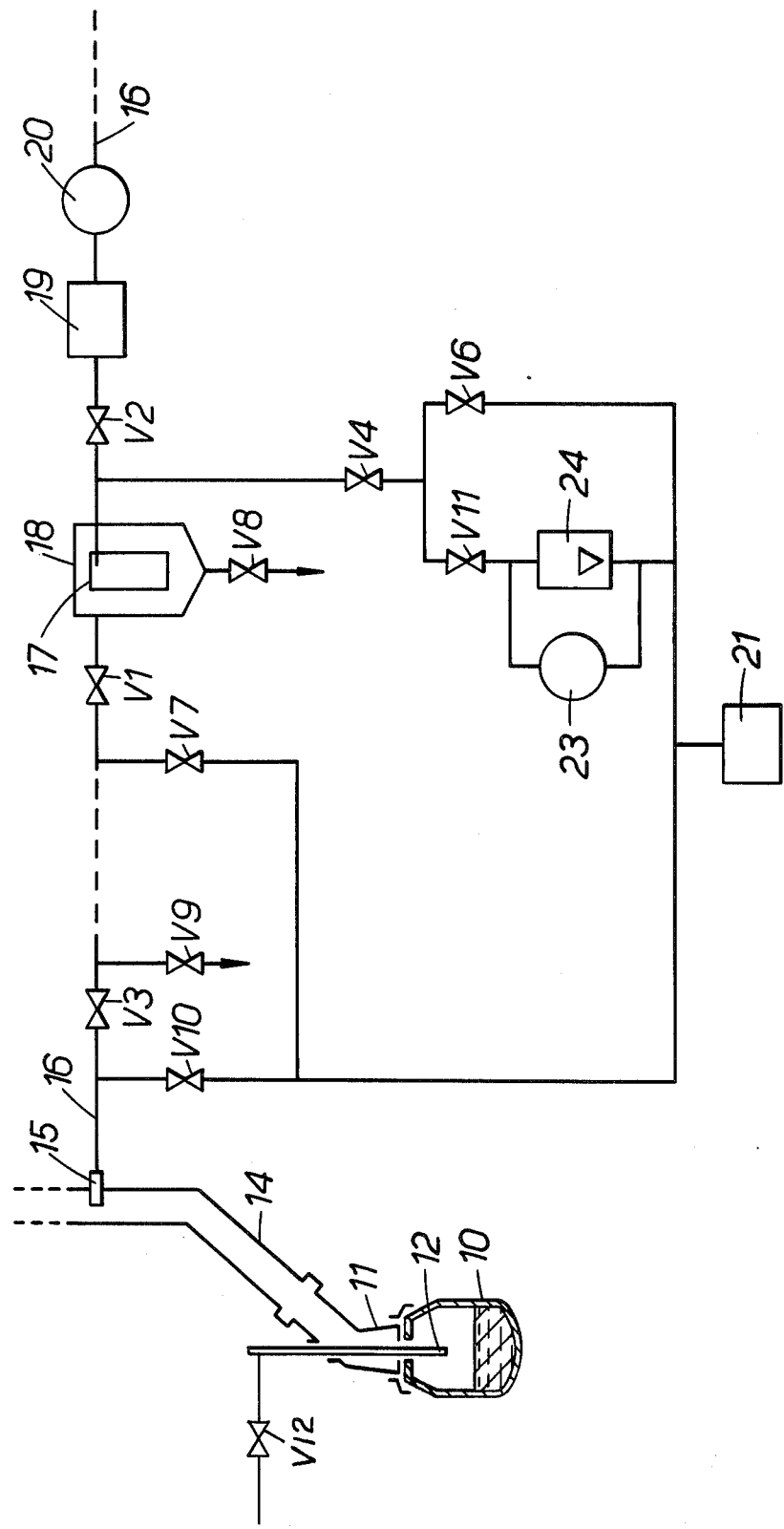

FILTERING A GAS STREAM

This invention relates to filtering a gas stream. It is particularly concerned with clearing collected particulate matter from a filter at intervals in the filtration of the gas stream.

The invention is well suited to use in the control of basic oxygen steelmaking by a technique which involves analysing the waste gas for carbon monoxide and carbon dioxide to monitor the progress of the decarburisation reactions. In such a technique a hot gas sample is drawn from the waste gas duct of the steelmaking vessel and needs to be cleaned and cooled before it is analysed. The filter used to clean the gas of fume, i.e. solid particulate matter, must be periodically cleaned of the accumulated solids.

In accordance with the invention there is provided a method of removing particulate matter from a gas stream by passing the gas through a filter, including the step of cleaning the filter of trapped particles during an interval in the passage of the gass by pressurising the filter and then rapidly releasing the pressure from the filter from the inlet side of the filter.

The filter is preferably pressurised with clean gas, for example compressed air or nitrogen.

The pressure applied should preferably be as great as possible consistent with the economies of providing high pressure and building the filter and associated pipework to withstand high pressures. A suitable pressure might be within the range of 60 to 90 p.s.i. (4.2 to 6.3 kg/cm$^2$).

The pressure should be released as rapidly as possible, the object being to achieve near instantaneous exhaustion through the filter with explosive force, to dislodge and remove the solids from the filter. A slow bleed would not achieve the desired effect. Any pressure release from what is normally the outlet side of the filter, other than through the filter, should not take place until after the initial pressure release from the inlet side.

The pressurised region may be extended beyond the filter on its inlet side as far as the point where the contaminated gas stream is admitted to the system, so that solids deposited in the pipework can also be removed.

It is possible to follow the release of pressure by a continuous back flush of gas through the filter and any other parts subjected to pressurisation and pressure release.

Particles dislodged but not initially exhausted may in this way be subsequently removed.

One embodiment of the invention is shown by way of example, in the accompanying drawing, which shows schematically and not to scale a BOS vessel with its exhaust system and an exhaust gas sampling line including a filter.

The steelmaking vessel 10 is shown with a hood 11 and an oxygen lance 12. The hood draws the hot exhaust gases into a waste gas duct 14, through which they are removed from the process.

A sampling probe 15 is set into the waste gas duct wall to remove a gas sample before it has been cleaned and cooled. The waste gas is sampled through the probe 15 at a temperature of about 1300° C and passes in a stream along a sampling duct 16 through a heated ceramic filter 17 in a filter bowl 18 and through a cooler 19 to a pump 20. In the filter fume particules are removed, and in the cooler the gas temperature is reduced to normal ambient temperature. Beyond the pump 20 the stream of sample gas continues along the duct 16 to be eventually analysed.

The filter 17 and the sampling probe 15 and inlet pipework 16 are cleaned at the end steelmaking process, when the gas stream for analysis ceases to be required, by compressed air from a source 21 at a pressure of about 80 p.s.i. (5.6 kg/cm$^2$). The sequence of events is predetermined and is initiated by the closing of the lance oxygen control valve V12.

Initially all valves are closed except V1, V2 and V3 in the duct 16. The first change is the closing of V1, V2 and V3 and the opening of V4.

Next, the valve V6 opens for a short period to pressurise the filter while the valve V7 opens to pressurise the inlet pipework. These valves then close.

The 80 p.s.i. pressure is then explosively released by opening V8 to atmosphere, to release air and dirt from the filter, and V9 to atmosphere, to release air and dirt from the inlet pipe work.

The valve V10 is simultaneously opened for a short period to purge the probe 15.

The valves V8, V9 and V10 then close, following which the pressurisation and pressure release sequences can be repeated for two more cycles.

On the fourth cycle the valve V6 remains closed, V8 remains open and V11 remains opens. This allows a 5 p.s.i. (0.35 kg/cm$^2$) air bleed into the filter through rotameter 24 and thence through V4 and V8. The filter can at this stage be checked for blockage by means of differential pressure switch 23 which responds to the pressure drop across the rotameter 24.

To return the system to its normal operational condition all open valves are closed and V1, V2 and V3 are re-opened.

The valve V8 has a large outlet and is able to release a pressure between 70 and 90 p.s.i. (4.9 and 6.3 kg/cm$^2$) from the whole pressurised region within 100 milliseconds. This creates a shock wave in the filter which effectively dislodges collected fume particles.

The full cycle in which the probe 15, the primary filter 17 and the pipework are cleaned and purged takes about one minute and is repeated for 5 to 15 cycles to ensure most effective results.

We claim:

1. A method of removing particulate matter from a gas stream having particulate matter suspended therein, comprising passing the gas stream through a filter mounted within a housing having a dirty gas stream inlet and a clean gas stream outlet together with a valve-controlled outlet opening directly to the atmosphere and positioned on the inlet side of the filter, whereby particulate matter is trapped by the filter, and cleaning the filter of trapped particles during an interval in which the passage of the gas stream through said inlet and outlet is stopped; said cleaning comprising pressurising the housing such that both sides of the filter are at the same high pressure, and subsequently releasing the pressure with explosive rapidity directly to the atmosphere through said valve-controlled outlet to thereby shock the accumulated particles from said filter.

2. A method according to claim 1 wherein the housing is pressurised to 4.2 to 6.3 kg/cm$^2$.

3. A method according to claim 1 wherein the pressure is released from the housing in less than 100 milliseconds.

4. A method according to claim 1 wherein the release of pressure is followed by passing a back flush of gas through the filter to purge dislodged particles from the system.

5. A method according to claim 1 wherein the filter is a heated ceramic filter.

6. A method according to claim 1 in which the gas stream is sampled from a basic oxygen steelmaking furnace having a lance through which oxygen is supplied for refining purposes via a control valve, and wherein the filter cleaning operation beginning with the pressurising of the housing is initiated by the closing of the lance oxygen control valve.

* * * * *